US010763948B2

(12) United States Patent
Qu et al.

(10) Patent No.: US 10,763,948 B2
(45) Date of Patent: Sep. 1, 2020

(54) SIGNAL SENDING METHOD AND APPARATUS, AND SIGNAL RECEIVING METHOD AND APPARATUS

(71) Applicant: HUAWEI TECHNOLOGIES CO., LTD., Shenzhen, Guangdong (CN)

(72) Inventors: Bingyu Qu, Beijing (CN); Jianqin Liu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/460,110

(22) Filed: Jul. 2, 2019

(65) Prior Publication Data

US 2019/0326978 A1 Oct. 24, 2019

Related U.S. Application Data

(63) Continuation of application No. PCT/CN2017/119052, filed on Dec. 27, 2017.

(30) Foreign Application Priority Data

Jan. 6, 2017 (CN) .......................... 2017 1 0011442

(51) Int. Cl.
*H04L 23/02* (2006.01)
*H04B 7/12* (2006.01)
(Continued)

(52) U.S. Cl.
CPC .............. *H04B 7/12* (2013.01); *H04B 7/0623* (2013.01); *H04L 7/041* (2013.01);
(Continued)

(58) Field of Classification Search
CPC ..... H04L 1/0054; H04L 1/005; H04L 1/0026; H03M 13/41; H04B 7/0639; H04B 7/065
(Continued)

(56) References Cited

U.S. PATENT DOCUMENTS

2011/0176498 A1 7/2011 Montojo et al.
2012/0106388 A1 5/2012 Shimezawa et al.
(Continued)

FOREIGN PATENT DOCUMENTS

CN 102461249 A 5/2012
CN 102474405 A 5/2012
(Continued)

*Primary Examiner* — Khai Tran
(74) *Attorney, Agent, or Firm* — Womble Bond Dickinson (US) LLP

(57) ABSTRACT

A signal sending method and apparatus, and a signal receiving method and apparatus are provided, to ensure a low peak-to-average power ratio and a frequency domain diversity gain when a signal is sent on two different subcarrier groups in a same time cell. The method includes: mapping, by a transmit end, a first sequence $\{p_i a_0, p_i a_1, \ldots, p_i a_{P-1}\}$ whose length is P into an $i^{th}$ subcarrier group in M subcarrier groups in a same time cell, where the $i^{th}$ subcarrier group includes K consecutive subcarriers that are evenly distributed, M, P, and K are all greater than or equal to 2, P≤K, there is at least one pair of two inconsecutive subcarrier groups in the M subcarrier groups, and a second sequence $\{p_i\}$ corresponding to the M subcarrier groups meets the following requirement: A sequence $\{x_i\}$ is a Barker sequence, where $\{x_i\} = \{x_i | x_1 = p_{s+1}, x_2 = p_{s+2}, \ldots, x_{M-s} = p_M, x_{M-s+1} = p_1, x_{M-s+2} = p_2, \ldots, x_M = p_s\}$, or a sequence $\{cx_i\}$ is a second sequence corresponding to M consecutive subcarrier groups, where c is a non-zero complex number; generating, by the transmit end, a sending signal based on signals on subcarriers in the $i^{th}$ subcarrier group; and sending, by the transmit end, the sending signal.

20 Claims, 7 Drawing Sheets

(51) Int. Cl.
*H04B 7/06* (2006.01)
*H04L 7/04* (2006.01)
*H04L 27/00* (2006.01)
*H04L 27/26* (2006.01)

(52) U.S. Cl.
CPC ...... *H04L 27/0014* (2013.01); *H04L 27/2657* (2013.01); *H04L 2027/0095* (2013.01)

(58) Field of Classification Search
USPC .......................................................... 375/262
See application file for complete search history.

(56) References Cited

U.S. PATENT DOCUMENTS

| | | |
|---|---|---|
| 2015/0071233 A1 | 3/2015 | Wang et al. |
| 2015/0173070 A1 | 6/2015 | Aboul-Magd et al. |
| 2018/0146460 A1* | 5/2018 | Lee ................... H04W 72/042 |
| 2019/0081838 A1* | 3/2019 | Qu ......................... H04L 5/001 |

FOREIGN PATENT DOCUMENTS

| | | |
|---|---|---|
| CN | 103582137 A | 2/2014 |
| WO | 2008042189 A1 | 4/2008 |
| WO | 2009022856 A2 | 2/2009 |

\* cited by examiner

SIGNAL SENDING METHOD AND APPARATUS, AND SIGNAL RECEIVING METHOD AND APPARATUS

CROSS-REFERENCE TO RELATED APPLICATIONS

This application is a continuation of International Application No. PCT/CN2017/119052, filed on Dec. 27, 2017, which claims priority to Chinese Patent Application No. 201710011442.X, filed on Jan. 6, 2017. The disclosures of the aforementioned applications are hereby incorporated by reference in their entireties.

TECHNICAL FIELD

This application relates to the field of communications technologies, and in particular, to a signal sending method and apparatus, and a signal receiving method and apparatus.

BACKGROUND

In a Long Term Evolution (LTE) system, a terminal transmits physical uplink control information (PUCCH) through frequency domain hopping between two slots, to obtain a frequency domain diversity gain.

As shown in FIG. 1, RBs in a PUCCH area are numbered in an order of first time domain and then frequency domain. A PUCCH resource is located at an edge of a transmit frequency band, and the PUCCH is transmitted through frequency hopping between slots in a same subframe. For example, a PUCCH corresponding to a resource block m=0 is transmitted in a first slot in a subframe by occupying a last resource block on a frequency band, and is transmitted in a second slot on a first resource block on the frequency band through frequency hopping. In this way, a frequency domain diversity gain of uplink control information can be obtained through frequency hopping. In addition, because the terminal transmits data only on one resource block in each slot, data transmission in each slot may have a low peak-to-average power ratio (PAPR).

However, with continuous upgrade of a wireless communications system, in a new-generation wireless communications system, because a format for transmitting an uplink signal by the terminal may not necessarily include two slots, a frequency domain diversity gain of uplink control information cannot be obtained through frequency hopping between two slots. If frequency-domain frequency hopping is performed in a same timeslot, to be specific, a same signal is transmitted on two inconsecutive resource blocks in one slot; or to ensure flexibility of resource allocation, a same signal needs to be transmitted on inconsecutive resource blocks, for example, a reference signal or a signal of a control channel; a low PAPR characteristic of single-carrier signal transmission is damaged, and a high peak-to-average power ratio is caused.

SUMMARY

Embodiments of this application provide a signal sending method and apparatus, and a signal receiving method and apparatus, to resolve the following problem: When a same signal is sent on two inconsecutive resource blocks in one slot, a low peak-to-average power ratio characteristic is destroyed, and a high peak-to-average power ratio is caused.

Specific technical solutions provided in the embodiments of this application are as follows.

According to a first aspect, a signal sending and receiving method is provided, where the method includes: spreading, by a transmit end, different subcarrier groups in a same time cell by using a sequence, where the different subcarrier groups are inconsecutive, and the used sequence meets the following requirements: A first element starts from a subcarrier group with a larger number in the inconsecutive subcarrier groups, a last element ends at a subcarrier group with a smaller number in the inconsecutive subcarrier groups, and a formed sequence is a Barker sequence, or the formed sequence is a sequence, of a same length, corresponding to consecutive subcarrier groups. In this way, when a signal is transmitted on two inconsecutive subcarrier groups in one time cell, not only a low PAPR characteristic of signal transmission can be ensured, but also a frequency domain diversity gain can be obtained.

In one embodiment, the transmit end maps a first sequence $\{p_i a_0, p_i a_1, \ldots, p_i a_{P-1}\}$ into an $i^{th}$ subcarrier group in M subcarrier groups, where a length of the first sequence is P; the M subcarrier groups are in a same time cell; the $i^{th}$ subcarrier group includes K consecutive subcarriers that are evenly distributed; M≥2, P≥2, K≥2, P≤K, M, P, and K are all positive integers, and i=1, 2, ..., M; there are at least two consecutively numbered subcarrier groups in the M subcarrier groups: an $s^{th}$ subcarrier group and an $(s+1)^{th}$ subcarrier group; s is a positive integer; a minimum interval between a center frequency of any subcarrier in the $s^{th}$ subcarrier group and a center frequency of any subcarrier in the $(s+1)^{th}$ subcarrier group is greater than one subcarrier; and a second sequence $\{p_i\}$ corresponding to the M subcarrier groups meets the following requirement: A sequence $\{x_i\}$ is a Barker sequence, where $x_1 = p_{s+1}, x_2 = p_{s+2}, \ldots, x_{M-s} = p_M, x_{M-s+1} = p_1, x_{M-s+2} = p_2, \ldots, x_M = p_s$, or a sequence $\{cx_i\}$ is a second sequence corresponding to M consecutive subcarrier groups, where c is a non-zero complex number; generating, by the transmit end, a sending signal based on signals on subcarriers in the $i^{th}$ subcarrier group; and sending, by the transmit end, the sending signal.

In one embodiment, an interval between a center frequency of any subcarrier in the $s^{th}$ subcarrier group and a center frequency of any subcarrier in the $(s+1)^{th}$ subcarrier group is greater than or equal to frequency bandwidth of one subcarrier. A possible representation manner applicable to inconsecutive subcarrier groups in the solution provided in this application is provided.

In one embodiment, an interval between a center frequency of a $K^{th}$ subcarrier in the $s^{th}$ subcarrier group and a center frequency of a first subcarrier in the $(s+1)^{th}$ subcarrier group is frequency bandwidth of (L*K)+1 subcarriers, and L is a positive integer. A possible representation manner applicable to inconsecutive subcarrier groups in the solution provided in this application is provided.

In one embodiment, the mapping, by the transmit end, a first sequence whose length is P into an $i^{th}$ subcarrier group in M subcarrier groups is implemented in the following manner: The transmit end maps the first sequence whose length is P into P subcarriers included in the $i^{th}$ subcarrier group.

In one embodiment, the sequence $\{x_i\}$ is a sequence that is found by using a computer, that is mapped into the M consecutive subcarrier groups, and that has a peak-to-average power ratio less than or equal to a threshold.

In one embodiment, the first sequence mapped into the $i^{th}$ subcarrier group is a sequence that carries control information; and/or the first sequence mapped into the $i^{th}$ subcarrier group is a sequence of a demodulation reference signal;

and/or the first sequence mapped into the $i^{th}$ subcarrier group is a sequence of a sounding reference signal.

In one embodiment, when the first sequence mapped into the $i^{th}$ subcarrier group is a sequence including at least two types of signals, multiplexing is performed for the at least two types of signals through frequency division or code division.

In one embodiment, when M=3, the sequence $\{x_i\}$ corresponding to the M subcarrier groups is $\{u, u, -u\}$; or when M=2, the sequence $\{x_i\}$ corresponding to the M subcarrier groups is $\{u, uj\}$ or $\{u, -uj\}$, where j is an imaginary unit, and u is a non-zero complex number.

According to a second aspect, a signal sending apparatus is provided, where the signal sending apparatus has a function of implementing behavior of the transmit end in the first aspect and any possible implementation of the first aspect. The function may be implemented by using hardware, or may be implemented by executing corresponding software by hardware. The hardware or software includes one or more modules corresponding to the foregoing function.

According to a third aspect, a signal sending apparatus is provided, where the signal sending apparatus includes a transceiver, a processor, and a memory, the processor and the memory are connected to each other by using a bus system, the processor is configured to execute code in the memory, and when the code is executed, the processor performs the method in the first aspect or any possible implementation of the first aspect.

According to a fourth aspect, a signal receiving method is provided, where the method includes: generating, by a receive end, a first sequence $\{p_i a_0, p_i a_1, \ldots, p_i a_{P-1}\}$ on an $i^{th}$ subcarrier group in M subcarrier groups, where a length of the first sequence is P; the M subcarrier groups are in a same time cell; the $i^{th}$ subcarrier group includes K consecutive subcarriers that are evenly distributed; M≥2, P≥2, K≥2, P≤K, M, P, and K are all positive integers, and i=1, 2, ..., M; there are at least two consecutively numbered subcarrier groups in the M subcarrier groups: an $s^{th}$ subcarrier group and an $(s+1)^{th}$ subcarrier group; s is a positive integer; a minimum interval between a center frequency of any subcarrier in the $s^{th}$ subcarrier group and a center frequency of any subcarrier in the $(s+1)^{th}$ subcarrier group is greater than one subcarrier; and a second sequence $\{p_i\}$ corresponding to the M subcarrier groups meets the following requirement: A sequence $\{x_i\}$ is a Barker sequence, where $x_1 = p_{s+1}, x_2 = p_{s+2}, \ldots, x_{M-s} = p_M, x_{M-s+1} = p_1, x_{M-s+2} = p_2, \ldots, x_M = p_s$, or a sequence $\{cx_i\}$ is a second sequence corresponding to M consecutive subcarrier groups, where c is a non-zero complex number; receiving, by the receive end, a sending signal on the $i^{th}$ carrier group; and processing, by the receive end, the received signal by using the first sequence. In this way, when a signal is transmitted on two inconsecutive subcarrier groups in one time cell, not only a low PAPR characteristic of signal transmission can be ensured, but also a frequency domain diversity gain or scheduling flexibility can be achieved.

In one embodiment, an interval between a center frequency of any subcarrier in the $s^{th}$ subcarrier group and a center frequency of any subcarrier in the $(s+1)^{th}$ subcarrier group is greater than or equal to frequency bandwidth of one subcarrier. A possible representation manner applicable to inconsecutive subcarrier groups in the solution provided in this application is provided.

In one embodiment, an interval between a center frequency of a $K^{th}$ subcarrier in the $s^{th}$ subcarrier group and a center frequency of a first subcarrier in the $(s+1)^{th}$ subcarrier group is frequency bandwidth of (L*K)+1 subcarriers, and L is a positive integer. A possible representation manner applicable to inconsecutive subcarrier groups in the solution provided in this application is provided.

In one embodiment, the receive end generates the first sequence on P subcarriers included in the $i^{th}$ subcarrier group.

In one embodiment, the sequence $\{x_i\}$ is a sequence that is found by using a computer, that is mapped into the M consecutive subcarrier groups, and that has a peak-to-average power ratio less than or equal to a threshold.

In one embodiment, the first sequence mapped into the $i^{th}$ subcarrier group is a sequence that carries control information; and/or the first sequence mapped into the $i^{th}$ subcarrier group is a sequence of a demodulation reference signal; and/or the first sequence mapped into the $i^{th}$ subcarrier group is a sequence of a sounding reference signal.

In one embodiment, when the first sequence mapped into the $i^{th}$ subcarrier group is a sequence including at least two types of signals, multiplexing is performed for the at least two types of signals through frequency division or code division.

In one embodiment, when M=3, the sequence $\{x_i\}$ corresponding to the M subcarrier groups is $\{u, u, -u\}$; or when M=2, the sequence $\{x_i\}$ corresponding to the M subcarrier groups is $\{u, uj\}$ or $\{u, -uj\}$, where j is an imaginary unit, and u is a non-zero complex number.

According to a fifth aspect, a signal receiving apparatus is provided, where the signal receiving apparatus has a function of implementing behavior of the receive end in the fourth aspect and any possible implementation of the fourth aspect. The function may be implemented by using hardware, or may be implemented by executing corresponding software by hardware. The hardware or software includes one or more modules corresponding to the foregoing function.

According to a sixth aspect, a signal receiving apparatus is provided, where the signal receiving apparatus includes a transceiver, a processor, and a memory, the processor and the memory are connected to each other by using a bus system, the processor is configured to execute code in the memory, and when the code is executed, the processor performs the method in the fourth aspect or any possible implementation of the fourth aspect.

According to a seventh aspect, a computer storage medium is provided, configured to store a computer program. The computer program includes an instruction used to perform the method in the first aspect, the second aspect, any possible implementation of the first aspect, or any possible implementation of the second aspect.

In the solutions provided in the embodiments of this application, when a signal is transmitted on two inconsecutive subcarrier groups in one time cell, a low PAPR characteristic of signal transmission can be ensured. Therefore, not only a frequency diversity gain or scheduling flexibility that is brought by allocation of inconsecutive resources can be obtained, but also a low PAPR can be obtained, so that a transmitter can have larger transmit power to improve coverage or performance.

DESCRIPTION OF EMBODIMENTS

Embodiments of this application provide a signal sending method and apparatus, and a signal receiving method and apparatus. A transmit end spreads different subcarrier groups in a same time cell by using a sequence. The different subcarrier groups are inconsecutive, and the used sequence meets the following requirements: A first element starts from a subcarrier group with a larger number in the inconsecutive subcarrier groups, a last element ends at a subcarrier group with a smaller number in the inconsecutive subcarrier groups, and a formed sequence is a Barker sequence, or the formed sequence is a sequence, of a same length, corresponding to consecutive subcarrier groups. In this way, when a signal is transmitted on two inconsecutive subcarrier groups in one time cell, not only a low PAPR characteristic of signal transmission can be ensured, but also a frequency domain diversity gain can be obtained.

Figure 1:
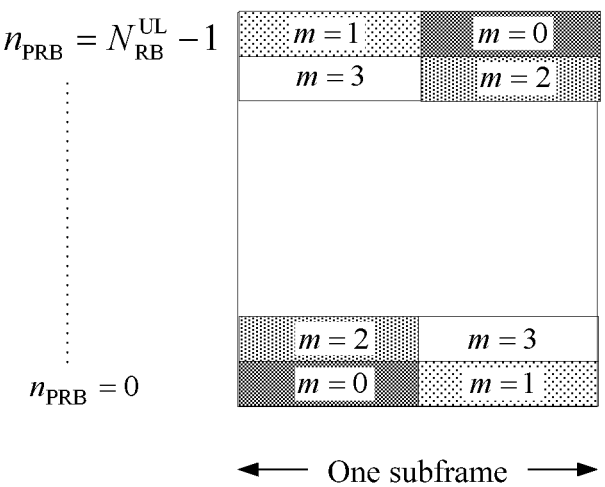
FIG. 1 is a schematic diagram of a method for sending uplink control information through frequency hopping in the prior art.
Figure 2:
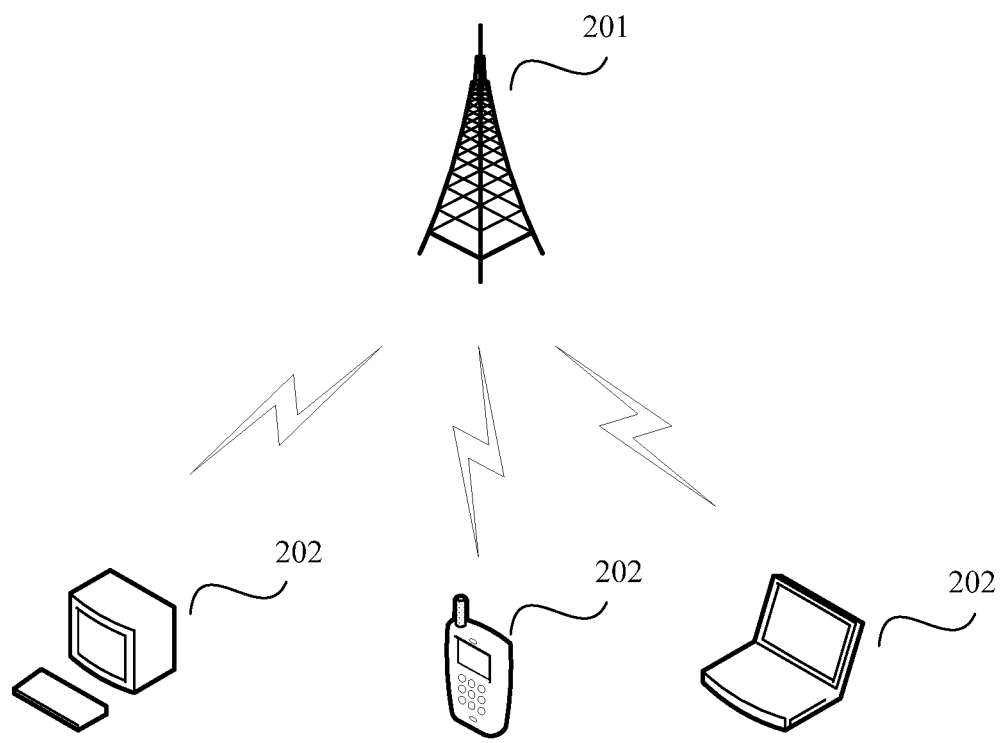
FIG. 2 is a schematic diagram of a system architecture according to an embodiment of this application.

As shown in FIG. 2, a system architecture used in the embodiments of this application includes a network device 201 and a terminal 202. The network device 201 may be a base station, or may be another network device that has a base station function, or in particular, may be a terminal serving as a base station in device-to-device (D2D) communication. The base station is an apparatus that is deployed in a radio access network and that is configured to provide a wireless communication function for the terminal 202. The base station may include a macro base station, a micro base station, a relay node, an access point, and the like in various forms. The base station may be applied to systems using different radio access technologies, for example, an LTE system, or more possible communications systems such as a 5G communications system. The terminal 202 may include various handheld devices having a wireless communication function, an in-vehicle device, a wearable device, or a computing device or another processing device connected to a wireless modem, and user equipment (UE), a mobile station (MS), or the like in various forms.

With reference to the accompanying drawings, the following describes in detail a signal sending and receiving method provided in an embodiment of this application.

It should be noted that, in this embodiment of this application, a transmit end may be the network device 201 in the system architecture shown in FIG. 2, or may be the terminal 202. If the transmit end is the network device 201, a receive end is the terminal 202. Alternatively, if the transmit end is the terminal 202, a receive end is the network device 201. A subcarrier group is a carrier set including several subcarriers. For example, a subcarrier group may be a resource block. A time cell may be one symbol or two or more symbols, for example, may be a slot.

Figure 3:
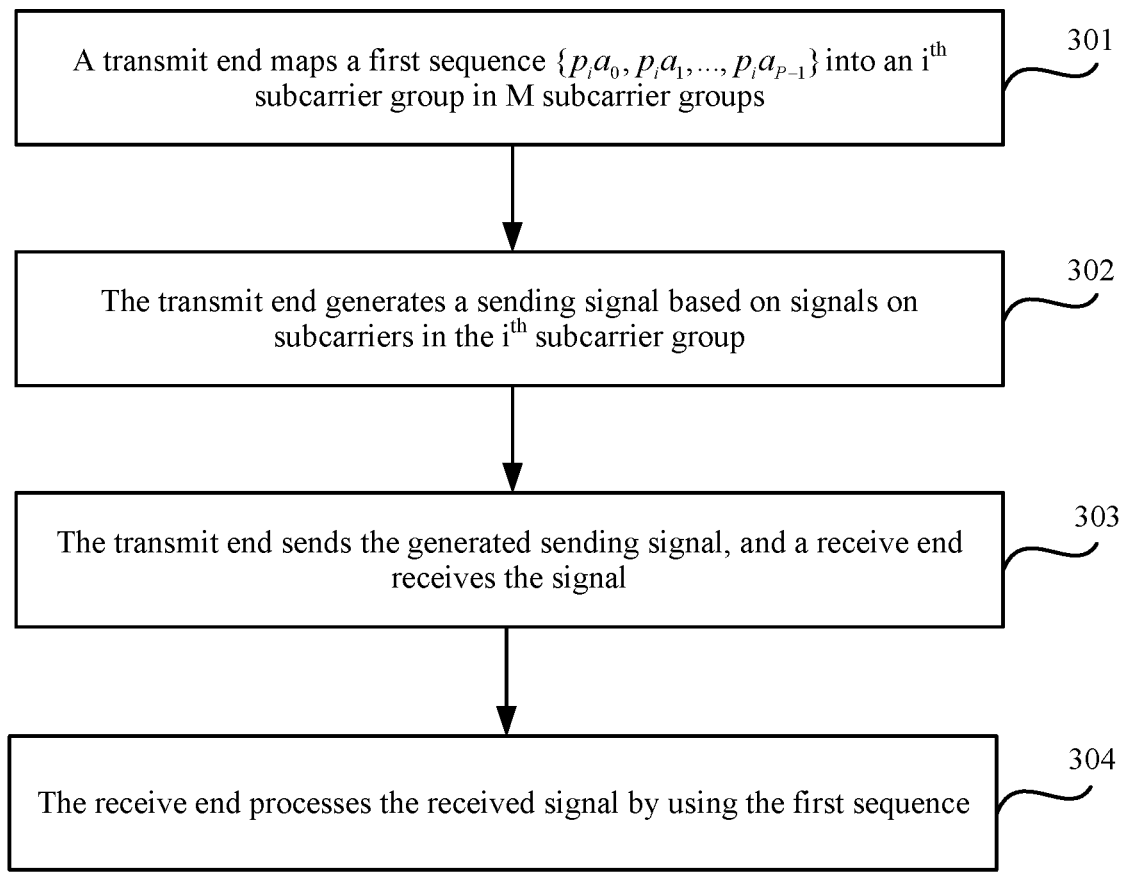
FIG. 3 is a schematic flowchart of a signal sending and receiving method according to an embodiment of this application.

As shown in FIG. 3, a specific process of the signal sending and receiving method in this embodiment of this application is as follows:

Operation 301: A transmit end maps a first sequence $\{p_i a_0, p_i a_1, \ldots, p_i a_{P-1}\}$ into an $i^{th}$ subcarrier group in M subcarrier groups.

The M subcarrier groups are in a same time cell, that is, the M subcarrier groups are M subcarrier groups in a same time cell. $M \geq 2$, and M is a positive integer A length of the first sequence is P, the $i^{th}$ subcarrier group includes K consecutive subcarriers that are evenly distributed. $P \leq K$, both P and K are positive integers. $P > 1$, and $K > 1$. The transmit end maps the first sequence whose length is P into P subcarriers included in the $i^{th}$ subcarrier group, where $i=1, 2, \ldots, M$. Elements in the first sequence are respectively and sequentially mapped into subcarriers. $\{a_0, a_1, \ldots, a_{P-1}\}$ may be considered as a basic sequence, and the first sequence is a sequence obtained by combining a second sequence $\{p_i\}$ and the basic sequence $\{a_0, a_1, \ldots, a_{P-1}\}$. Each subcarrier group in the M subcarrier groups corresponds to one number, numbers of all the subcarrier groups in the M subcarrier groups may be $1, 2, \ldots, M$, and a number corresponding to the $i^{th}$ subcarrier group is i. For example, a first sequence $\{p_1, a_0, p_1 a_1, \ldots, p_1 a_{P-1}\}$ is mapped into a first subcarrier group in the M subcarrier groups; and a first sequence $\{p_2 a_0, p_2 a_1, \ldots, p_2 a_{P-1}\}$ is mapped into a second subcarrier group in the M subcarrier groups.

Two consecutively numbered subcarrier groups in the M subcarriers may be consecutive or inconsecutive, but the M subcarrier groups include at least one pair of two consecutively numbered subcarrier groups that are inconsecutive. To be specific, the M subcarrier groups include at least two consecutively numbered subcarrier groups that are inconsecutive: an $s^{th}$ subcarrier group and an $(s+1)^{th}$ subcarrier group, and s is a positive integer. That the $s^{th}$ subcarrier group and the $(s+1)^{th}$ subcarrier group are inconsecutive may be expressed as follows: A minimum interval between a center frequency of any subcarrier in the $s^{th}$ subcarrier group and a center frequency of any subcarrier in the $(s+1)^{th}$ subcarrier group is greater than one subcarrier. An interval between center frequencies of two subcarriers is defined as a distance between the center frequencies of the two subcarriers. Therefore, an interval between center frequencies of two subcarriers that are consecutive in frequency domain is frequency bandwidth of one subcarrier, and an interval between center frequencies of two subcarriers that are inconsecutive in frequency domain is greater than frequency bandwidth of one subcarrier.

The second sequence $\{p_i\}$ corresponding to the M subcarrier groups meets the following requirement: $\{x_i\}$ is a Barker sequence, where $x_1 = p_{s+1}, x_2 = p_{s+2}, \ldots, x_{M-s} = p_M, x_{M-s+1} = p_1, x_{M-s+2} = p_2, \ldots, x_M = p_s$, or $\{cx_i\}$ is a second sequence corresponding to M consecutive subcarrier groups, where c is a non-zero complex number. The sequence $\{x_i\}$ includes same elements as the second sequence $\{p_i\}$, but the elements are sequenced differently. A first element in the sequence $\{x_i\}$ corresponds to an $(s+1)^{th}$ element in the second sequence $\{p_i\}$, and a second element in the sequence $\{x_i\}$ corresponds to an $(s+2)^{th}$ element in the second sequence $\{p_i\}$. Arrangement is performed in the same selection order until an $(M-(s-1))^{th}$ element in the sequence $\{x_i\}$ corresponds to an $M^{th}$ element in the second sequence $\{p_i\}$, an $(M-s)^{th}$ element in the sequence $\{x_i\}$ corresponds to a first element in the second sequence $\{p_i\}$, and an $(M-(s+1))^{th}$ element in the sequence $\{x_i\}$ corresponds to a second element in the second sequence $\{p_i\}$. Arrangement is still performed in the same selection order until an $M^{th}$ element in the sequence $\{x_i\}$ corresponds to an $s^{th}$ element in the second sequence $\{p_i\}$.

In one embodiment, when M=3, the sequence $\{x_i\}$ corresponding to the M subcarrier groups is $\{u, u, -u\}$; or when M=2, the sequence $\{x_i\}$ corresponding to the M subcarrier groups is $\{u, uj\}$ or $\{u, -uj\}$, where j is an imaginary unit, and u is a non-zero complex number.

When the first sequence is mapped into M consecutive subcarrier groups, aperiodic autocorrelation of the second sequence is relatively low, a peak-to-average power ratio of the first sequence is relatively low. Because the Barker sequence is a sequence with relatively low aperiodic autocorrelation, the Barker sequence can be selected as the second sequence. When the first sequence is mapped into M inconsecutive subcarrier groups, an order of the second sequence of the consecutive subcarrier groups needs to be changed to obtain a second sequence of the M inconsecutive subcarrier groups. In this way, a low peak-to-average power ratio can be obtained. After the order is changed, the peak-to-average power ratio is the same as that in a case of the M consecutive subcarrier groups. When an order of a sequence is changed, an aperiodic autocorrelation characteristic is changed. In a case of M inconsecutive subcarriers, a sequence obtained after an order is changed has a low aperiodic autocorrelation characteristic, and the peak-to-average power ratio is low. However, a sequence existing before the order is changed does not necessarily have low aperiodic autocorrelation. For example, (1, 1, −1) has very low aperiodic autocorrelation, and an unnormalized aperiodic autocorrelation value is 1. However, an unnormalized aperiodic correlation value of (1, −1, 1) is 2.

Operation 302: The transmit end generates a sending signal based on signals on subcarriers in the $i^{th}$ subcarrier group.

Operation 303: The transmit end sends the generated sending signal, and a receive end receives the signal on the $i^{th}$ subcarrier group.

Operation 304: The receive end processes the received signal by using the generated first sequence $\{p_1, a_0, p_1, a_1, \ldots, p_i a_{P-1}\}$ on the $i^{th}$ subcarrier group in the M subcarrier groups.

A process in which the receive end processes the received signal includes: detecting information carried in the first sequence, or performing channel estimation based on the first sequence. For example, the receive end needs to multiply the element in the generated sequence by the received signal, and then perform signal detection or channel estimation.

In one embodiment, that the $s^{th}$ subcarrier group and the $(s+1)^{th}$ subcarrier group are inconsecutive may be alternatively expressed in the following two manners, where the two manners impose no limitation:

Manner 1: An interval between a center frequency of any subcarrier in the $s^{th}$ subcarrier group and a center frequency of any subcarrier in the $(s+1)^{th}$ subcarrier group is greater than or equal to frequency bandwidth of one subcarrier.

Manner 2: An interval between a center frequency of a $K^{th}$ subcarrier in the $s^{th}$ subcarrier group and a center frequency of a first subcarrier in the $(s+1)^{th}$ subcarrier group is frequency bandwidth of (L*K)+1 subcarriers, and L is a positive integer.

In this embodiment of this application, the sequence $\{x_i\}$ may be alternatively found by using a computer, and the sequence $\{x_i\}$ and the second sequence $\{p_i\}$ meet the foregoing mapping order. A peak-to-average power ratio of the sequence $\{x_i\}$ is less than or equal to a threshold. The sequence $\{x_i\}$ may be a second sequence corresponding to M consecutive subcarrier groups. In the M consecutive subcarrier groups, a minimum interval between center frequencies of two subcarriers in any two consecutively numbered subcarrier groups: an $s^{th}$ subcarrier group and an $(s+1)^{th}$ subcarrier group is equal to frequency bandwidth of one subcarrier.

In one embodiment, the first sequence mapped into the $i^{th}$ subcarrier group includes at least one of the following: a sequence of control information, a sequence of a demodulation reference signal (DMRS), a sequence of a sounding reference signal (SRS), or a sequence of a channel state information-reference signal (CSI-RS for short).

The control information may be uplink control information (UCI) carried on an uplink control channel, for example, uplink control information carried on a physical uplink control channel (PUCCH); or may be downlink control information carried on a downlink control channel, for example, downlink control information carried on a physical downlink control channel (PDCCH).

The demodulation reference signal may be an uplink demodulation reference signal or a downlink demodulation reference signal.

The sounding reference signal may be an uplink sounding reference signal or a downlink sounding reference signal.

In one embodiment, when the first sequence mapped into the $i^{th}$ subcarrier group is a sequence including at least two types of signals, multiplexing is performed for the at least two types of signals through frequency division or code division, or by using a combination thereof.

The first sequence mapped into the $i^{th}$ subcarrier group may alternatively carry a data channel. The data channel may be an uplink data channel such as a physical uplink shared channel (PUSCH), or may be a downlink data channel such as a physical downlink shared channel (PDSCH).

The first sequence mapped into the $i^{th}$ subcarrier group may alternatively be a sequence of system information carried on a broadcast channel, for example, a sequence of physical broadcast channel (PBCH) information; or may be a sequence of a synchronization signal used for synchronization, including a primary synchronization signal (PSS) or a secondary synchronization signal (SSS).

With reference to a specific application scenario, the following further describes in detail the signal sending and receiving method provided in this embodiment of this application.

Figure 4:
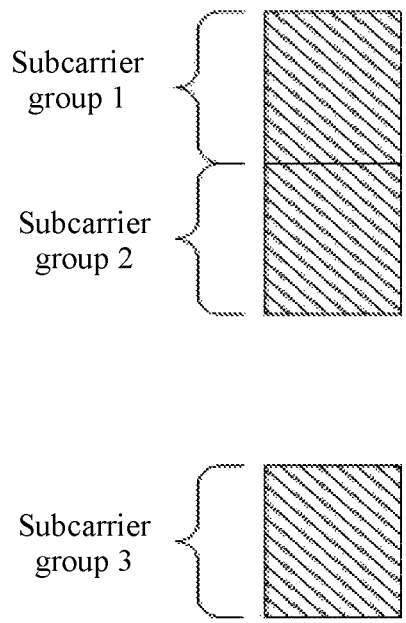
FIG. 4 is a schematic diagram 1 in which a subcarrier group carries a sequence element according to an embodiment of this application.
Figure 5:
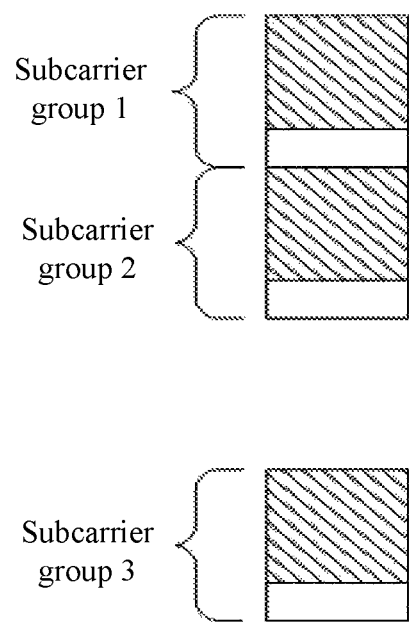
FIG. 5 is a schematic diagram 2 in which a subcarrier group carries a sequence element according to an embodiment of this application.

As shown in FIG. 4 and FIG. 5, it is assumed that M=3. Numbers of the three subcarrier groups are respectively a subcarrier group 1, a subcarrier group 2, and a subcarrier group 3. The subcarrier group 1 and the subcarrier group 2 are consecutive, and the subcarrier group 2 and the subcarrier group 3 are inconsecutive. Each subcarrier group includes K consecutive subcarriers that are evenly distributed. The length of the first sequence is P, P≤K, and both P and K are positive integers greater than 1.

A first sequence mapped by the transmit end into the subcarrier group 1 is $\{p_1a_0, p_1a_1, \ldots, p_1a_{P-1}\}$.

A first sequence mapped by the transmit end into the subcarrier group 2 is $\{p_2a_0, p_2a_1, \ldots, p_2a_{P-1}\}$.

A first sequence mapped by the transmit end into the subcarrier group 3 is $\{p_3a_0, p_3a_1, \ldots, p_3a_{P-1}\}$.

In FIG. 4 and FIG. 5, shadow parts represent subcarriers used to carry elements in the first sequence.

As shown in FIG. 4, when P=K, the transmit end maps the first sequence $\{p_1a_0, p_1a_1, \ldots, p_1a_{P-1}\}$ into all subcarriers in the subcarrier group 1, maps the first sequence $\{p_2a_0, p_2a_1, \ldots, p_2a_{P-1}\}$ into all subcarriers in the subcarrier group 2, and maps the first sequence $\{p_3a_0, p_3a_1, \ldots, p_3a_{P-1}\}$ into all subcarriers in the subcarrier group 3.

As shown in FIG. 5, when P<K, the transmit end maps the first sequence $\{p_1a_0, p_1a_1, \ldots, p_1a_{P-1}\}$ into some subcarriers in the subcarrier group 1, maps the first sequence $\{p_2a_0, p_2a_1, \ldots, p_2a_{P-1}\}$ into some subcarriers in the subcarrier group 2, and maps the first sequence $\{p_3a_0, p_3a_1, \ldots, p_3a_{P-1}\}$ into some subcarriers in the subcarrier group 3.

When P<K, only some subcarriers in each subcarrier group are used to carry the elements (which may be briefly referred to as sequence elements) in the first sequence. In this case, a subcarrier in the K subcarriers that is not used to carry the sequence element is a virtual subcarrier, or a subcarrier used to transmit another type of signal different from a to-be-transmitted signal. The virtual subcarrier does not carry any information on a current resource block.

To be specific, a subcarrier that carries no sequence element may be a virtual subcarrier. Because the virtual subcarrier carries no sequence element, the subcarrier does not need to be a subcarrier that really exists in a current system, that is, a frequency resource corresponding to the virtual subcarrier may not be a frequency resource corresponding to a current carrier in the current system. Alternatively, when the subcarrier that carries no sequence element is a subcarrier that really exists in a current system, the subcarrier can be used to transmit another signal.

One subcarrier group may include W subgroups numbered from 0 to W−1, and the sequence elements occupy some subgroups in each subcarrier group, for example, only 0 to U−1 subgroups are used. Both U and W are positive integers. In each subcarrier group, patterns of frequency resources corresponding to subgroups used to carry the sequence elements may be the same, for example, 0 to U−1 subgroups in each subcarrier group are used to carry the sequence elements.

Each element in the first sequence is a complex number, where $P_1$, $P_2$, and $P_3$ are also complex numbers. Elements in the second sequence are mapped into the three subcarrier groups.

In actual application, the second sequence is a sequence that meets some characteristics. Because the subcarrier group 2 and the subcarrier group 3 are inconsecutive, a sequence $\{P_3, P_1, P_2\}$ is formed through sorting that starts from an element that is in the second sequence and that is corresponding to the subcarrier group 3 and ends at elements that are in the second sequence and that are corresponding to the subcarrier group 1 and the subcarrier group 2. $\{P_3, P_1, P_2\}$ is a Barker sequence, or $\{P_3, P_1, P_2\}$ is a sequence generated by using three consecutive subcarrier groups in the foregoing manner.

Constitution of a typical Barker sequence may be in the following form:

A binary Barker sequence whose length is k (k≥1) may be as follows:

| | |
|---|---|
| k = 1 | 1 |
| k = 2 | 1, 1 |
| k = 3 | 1, 1, −1 |
| k = 4 | 1, 1, 1, −1 |
| k = 5 | 1, 1, 1, −1, 1 |
| k = 7 | 1, 1, 1, −1, −1, 1, −1 |
| k = 11 | 1, 1, 1, −1, −1, −1, 1, −1, −1, 1, −1 |
| k = 13 | 1, 1, 1, 1, 1, −1, −1, −1, 1, −1, −1, 1, 1 |

Correspondingly, a quaternary Barker sequence whose length is k (k≥1) may be as follows:

| | |
|---|---|
| k = 1 | 1 |
| k = 2 | 1, j |
| k = 3 | 1, j, 1 |
| k = 4 | 1, j, −1, j |
| k = 5 | 1, j, −1, j, 1 |
| k = 7 | 1, j, −1, j, −1, j, 1 |
| k = 11 | 1, j, −1, j, −1, −j, −1, j, −1, j, 1 |
| k = 13 | 1, j, −1, −j, 1, −j, 1, −j, 1, −j, −1, j, 1 |

For more methods for generating a Barker sequence, refer to the following document: Generalized Barker Sequences, IEEE TRANSACTIONS ON INFORMATION THEORY, 1965 (10). A changed Barker sequence is still a Barker sequence, and the change may be $u_i \rightarrow u_i \cdot e^{2\pi i j(r+\alpha)/x}$, where r, α, x are real numbers, and j is an imaginary unit. The document is fully referenced in this embodiment of this application.

In one embodiment, a signal sent on each subcarrier group in the M subcarrier groups may be control information that carries a scheduling request, a demodulation reference signal, a sounding reference signal, or a control channel and a demodulation reference signal. The sent signal herein may be an uplink signal or a downlink signal. When uplink control information includes only a scheduling request, the uplink control information may not include a demodulation reference signal.

In some cases, there may be more than one signal sent on each subcarrier group. For example, when the signal is uplink control information and an uplink demodulation reference signal, transmission of at least two channels or at least two signals on one subcarrier group needs to ensure a low PAPR. The uplink control information and the uplink reference signal herein may be uplink control information that carries a hybrid automatic repeat request (Hybrid Automatic Repeat Request, HARQ)-acknowledgement (ACK)/negative acknowledgement (NACK), and a demodulation reference signal corresponding to the uplink control information; or may be uplink control information that carries channel state information, and a demodulation reference signal corresponding to the uplink control information.

Figure 6:
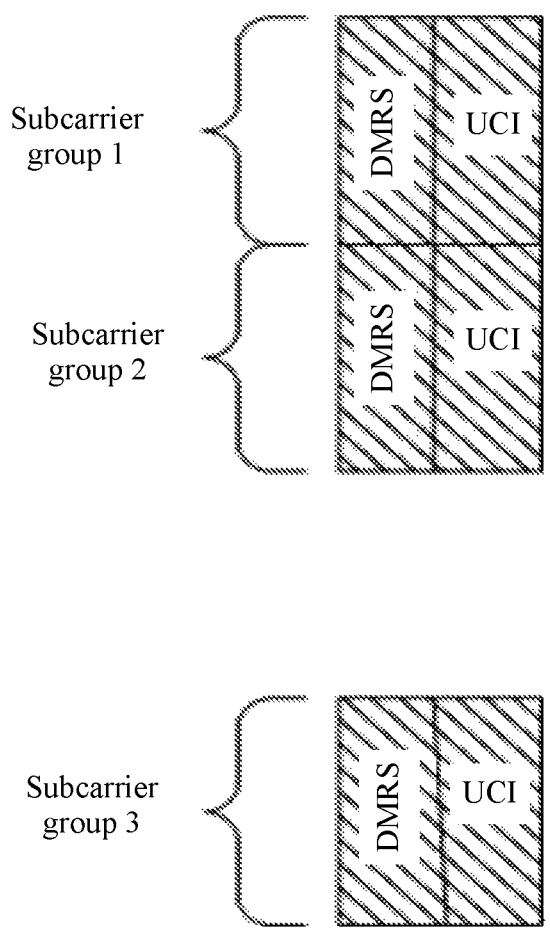
FIG. 6 is a schematic diagram of multiplexing a subcarrier group through time division according to an embodiment of this application.
Figure 7:
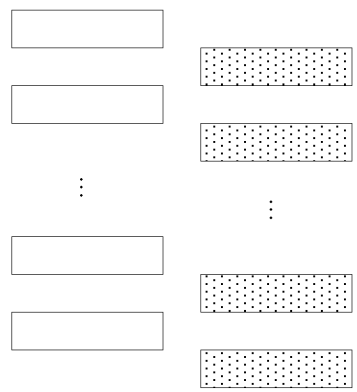
FIG. 7 is a schematic diagram of multiplexing a subcarrier group through frequency division according to an embodiment of this application.

In one embodiment, when a sequence mapped into each subcarrier group is at least two channels or signals, a same resource may be multiplexed for the at least two channels or signals in at least one of the following manners: frequency division, code division, or time division. For example, multiplexing is performed for a DMRS and UCI through time division shown in FIG. 6, or multiplexing is performed for a DMRS and UCI through comb frequency division plus repetition shown in FIG. 7.

Figure 8:
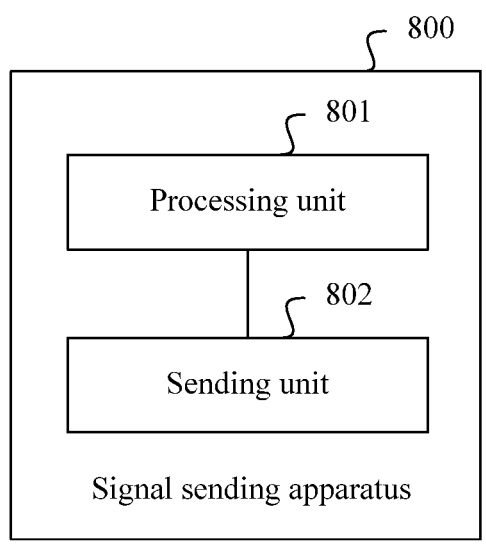
FIG. 8 is a schematic structural diagram 1 of a signal sending apparatus according to an embodiment of this application.

Based on a same inventive concept as the signal sending and receiving method shown in FIG. 3, as shown in FIG. 8, an embodiment of this application further provides a signal sending apparatus 800 that includes a processing unit 801 and a sending unit 802.

The processing unit 801 is configured to map a first sequence $\{p_i a_0, p_i a_1, \ldots, p_i a_{P-1}\}$ into an $i^{th}$ subcarrier group in M subcarrier groups, where a length of the first sequence is P; the M subcarrier groups are in a same time cell; the $i^{th}$ subcarrier group includes K consecutive subcarriers that are evenly distributed; $M \geq 2$, $P \leq K$, M, P, and K are all positive integers greater than 1, and $i=1, 2, \ldots, M$; there are at least two consecutively numbered subcarrier groups in the M subcarrier groups: an $s^{th}$ subcarrier group and an $(s+1)^{th}$ subcarrier group; s is a positive integer; a minimum interval between a center frequency of any subcarrier in the $s^{th}$ subcarrier group and a center frequency of any subcarrier in the $(s+1)^{th}$ subcarrier group is greater than one subcarrier; and a second sequence $\{p_i\}$ corresponding to the M subcarrier groups meets the following requirement: A sequence $\{x_i\}$ is a Barker sequence, where $x_1 = p_{s+1}$, $x_2 = p_{s+2}$, ..., $x_{M-s} = p_M$, $x_{M-s+1} = p_1$, $x_{M-s+2} = p_2$, ..., $x_M = p_s$, or a sequence $\{cx_i\}$ is a second sequence corresponding to M consecutive subcarrier groups, where c is a non-zero complex number.

The processing unit 801 is further configured to generate a sending signal based on signals on subcarriers in the $i^{th}$ subcarrier group.

The sending unit 802 is configured to send the sending signal generated by the processing unit 801.

In one embodiment, the processing unit 801 is configured to:

map the first sequence whose length is P into P subcarriers included in the $i^{th}$ subcarrier group.

In one embodiment, the sequence $\{x_i\}$ is a sequence that is found by using a computer, that is mapped into the M consecutive subcarrier groups, and that has a peak-to-average power ratio less than or equal to a threshold.

In one embodiment, when M=3, the sequence $\{x_i\}$ corresponding to the M subcarrier groups is $\{u, u, -u\}$; or when M=2, the second sequence $\{x_i\}$ corresponding to the M subcarrier groups is $\{u, uj\}$ or $\{u, -uj\}$, where j is an imaginary unit, and u is a non-zero complex number.

Figure 9:
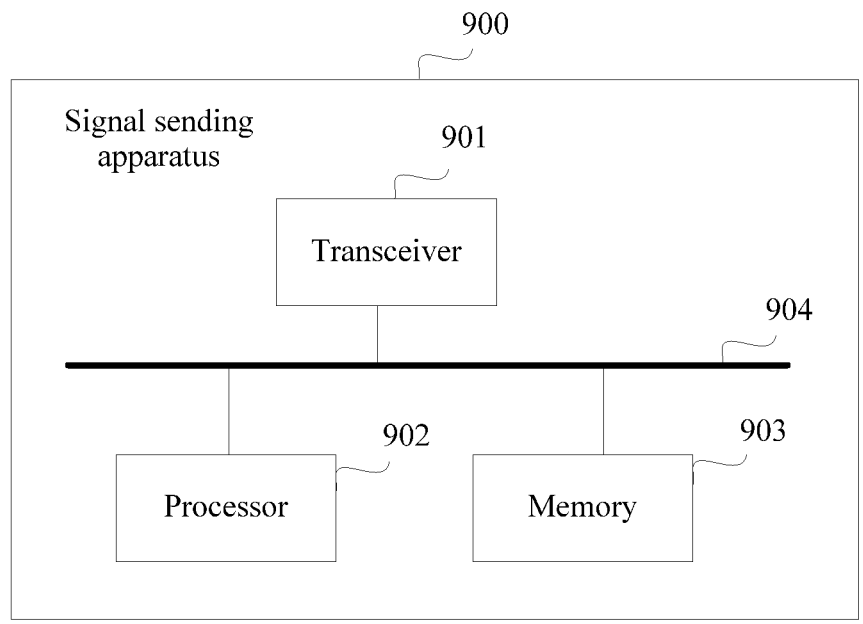
FIG. 9 is a schematic structural diagram 2 of a signal sending apparatus according to an embodiment of this application.

Based on a same inventive concept as the signal sending and receiving method shown in FIG. 3, as shown in FIG. 9, an embodiment of this application further provides a signal sending apparatus 900 that includes a transceiver 901, a processor 902, a memory 903, and a bus 904. The transceiver 901, the processor 902, and the memory 903 are all connected to the bus 904. The memory 903 stores a group of programs. The processor 902 is configured to invoke the program stored in the memory 903. When the program is executed, the processor 902 performs the following operations:

mapping a first sequence $\{p_i a_0, p_i a_1, \ldots, p_i a_{P-1}\}$ into an $i^{th}$ subcarrier group in M subcarrier groups, where a length of the first sequence is P; the M subcarrier groups are in a same time cell; the $i^{th}$ subcarrier group includes K consecutive subcarriers that are evenly distributed; $M \geq 2$, $P \leq K$, M, P, and K are all positive integers greater than 1, and $i=1, 2, \ldots, M$; there are at least two consecutively numbered subcarrier groups in the M subcarrier groups: an $s^{th}$ subcarrier group and an $(s+1)^{th}$ subcarrier group; s is a positive integer; a minimum interval between a center frequency of any subcarrier in the $s^{th}$ subcarrier group and a center frequency of any subcarrier in the $(s+1)^{th}$ subcarrier group is greater than one subcarrier; and a second sequence $\{p_i\}$ corresponding to the M subcarrier groups meets the following requirement: A sequence $\{x_i\}$ is a Barker sequence, where $x_1 = p_{s+1}$, $x_2 = p_{s+2}$, ..., $x_{M-s} = p_M$, $x_{M-s+1} = p_1$, $x_{M-s+2} = p_2$, ..., $x_M = p_s$, or a sequence $\{cx_i\}$ is a second sequence corresponding to M consecutive subcarrier groups, where c is a non-zero complex number; and generating a sending signal based on signals on subcarriers in the $i^{th}$ subcarrier group.

The transceiver 901 is configured to send the sending signal generated by the processor 902.

In one embodiment, the processor 902 is further configured to:

map the first sequence whose length is P into P subcarriers included in the $i^{th}$ subcarrier group.

The processor 902 may be a central processing unit (central processing unit, CPU), a network processor (network processor, NP), or a combination of a CPU and an NP.

The processor 902 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory 903 may include a volatile memory (volatile memory), such as a random access memory (random access memory, RAM). Alternatively, the memory 903 may include a nonvolatile memory (nonvolatile memory), such as a flash memory (flash memory), a hard disk drive (hard disk drive, HDD), or a solid-state drive (solid-state drive, SSD). Alternatively, the memory 903 may include a combination of the foregoing types of memories.

The signal sending apparatus 800 and the signal sending apparatus 900 may be configured to perform the signal sending and receiving method shown in FIG. 3. The processing unit 801 in FIG. 8 may be implemented by the processor 902 in FIG. 9, and the sending unit 802 in FIG. 8 may be implemented by the transceiver 901 in FIG. 9.

Figure 10:
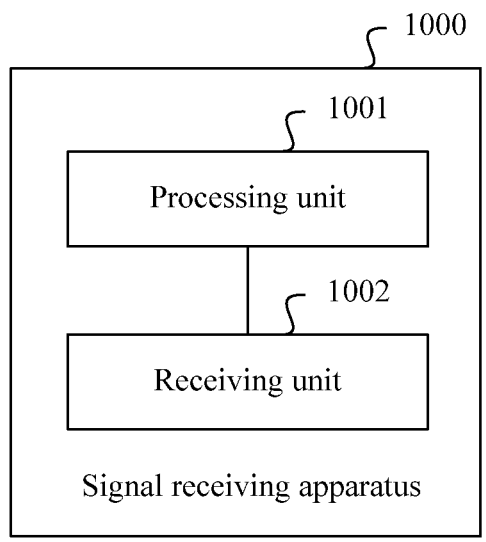
FIG. 10 is a schematic structural diagram 1 of a signal receiving apparatus according to an embodiment of this application.

Based on a same inventive concept as the signal sending and receiving method shown in FIG. 3, as shown in FIG. 10, an embodiment of this application further provides a signal receiving apparatus 1000 that includes a processing unit 1001 and a receiving unit 1002.

The processing unit 1001 is configured to generate a first sequence $\{p_i a_0, p_i a_1, \ldots, p_i a_{P-1}\}$ on an $i^{th}$ subcarrier group in M subcarrier groups, where a length of the first sequence is P; the M subcarrier groups are in a same time cell; the $i^{th}$ subcarrier group includes K consecutive subcarriers that are evenly distributed; $M \geq 2$, $P \leq K$, M, P, and K are all positive integers greater than 1, and $i=1, 2, \ldots, M$; there are at least two consecutively numbered subcarrier groups in the M subcarrier groups: an $s^{th}$ subcarrier group and an $(s+1)^{th}$ subcarrier group; s is a positive integer; a minimum interval between a center frequency of any subcarrier in the $s^{th}$ subcarrier group and a center frequency of any subcarrier in the $(s+1)^{th}$ subcarrier group is greater than one subcarrier; and a second sequence $\{p_i\}$ corresponding to the M subcarrier groups meets the following requirement: A sequence $\{x_i\}$ is a Barker sequence, where $x_1 = p_{s+1}$, $x_2 = p_{s+2}$, ..., $x_{M-s} = p_M$, $x_{M-s+1} = p_1$, $x_{M-s+2} = p_2$, ..., $x_M = p_s$, or a sequence $\{cx_i\}$ is a second sequence corresponding to M consecutive subcarrier groups, where c is a non-zero complex number.

The receiving unit 1002 is configured to receive a sending signal on the $i^{th}$ subcarrier group.

The processing unit 1001 is further configured to process, by using the first sequence, the signal received by the receiving unit.

In one embodiment, the sequence $\{x_i\}$ is a sequence that is found by using a computer, that is mapped into the M consecutive subcarrier groups, and that has a peak-to-average power ratio less than or equal to a threshold.

In one embodiment, when M=3, the sequence $\{x_i\}$ corresponding to the M subcarrier groups is $\{u, u, -u\}$; or when M=2, the sequence $\{x_i\}$ corresponding to the M subcarrier groups is $\{u, uj\}$ or $\{u, -uj\}$, where j is an imaginary unit, and u is a non-zero complex number.

Figure 11:
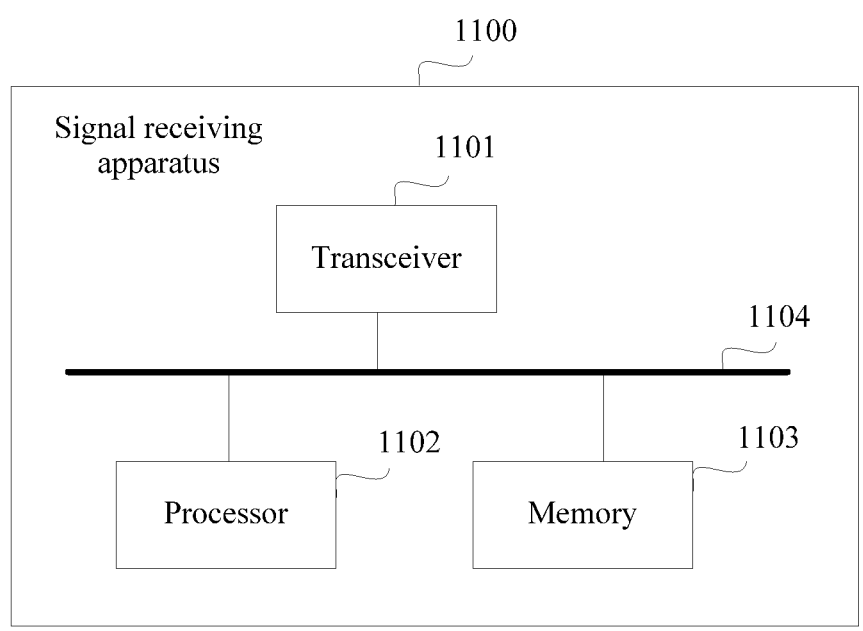
FIG. 11 is a schematic structural diagram 2 of a signal receiving apparatus according to an embodiment of this application.

Based on a same inventive concept as the signal sending and receiving method shown in FIG. 3, as shown in FIG. 11, an embodiment of this application further provides a signal receiving apparatus 1100 that includes a transceiver 1101, a processor 1102, a memory 1103, and a bus 1104. The transceiver 1101, the processor 1102, and the memory 1103 are all connected to the bus 1104. The memory 1103 stores a group of programs. The processor 1102 is configured to invoke the program stored in the memory 1103. When the program is executed, the processor 1102 performs the following operations:

generating a first sequence $\{p_i a_0, p_i a_1, \ldots, p_i a_{P-1}\}$ on an $i^{th}$ subcarrier group in M subcarrier groups, where a length of the first sequence is P; the M subcarrier groups are in a same time cell; the $i^{th}$ subcarrier group includes K consecutive subcarriers that are evenly distributed; M≥2, P≤K, M, P, and K are all positive integers greater than 1, and i=1, 2, ..., M; there are at least two consecutively numbered subcarrier groups in the M subcarrier groups: an $s^{th}$ subcarrier group and an $(s+1)^{th}$ subcarrier group; s is a positive integer; a minimum interval between a center frequency of any subcarrier in the $s^{th}$ subcarrier group and a center frequency of any subcarrier in the $(s+1)^{th}$ subcarrier group is greater than one subcarrier; and a second sequence $\{p_i\}$ corresponding to the M subcarrier groups meets the following requirement: A sequence $\{x_i\}$ is a Barker sequence, where $x_1=p_{s+1}$, $x_2=p_{s+2}$, ..., $x_{M-s}=p_M$, $x_{M-s+1}=p_1$, $x_{M-s+2}=p_2$, ..., $x_M=p_s$, or a sequence $\{cx_i\}$ is a second sequence corresponding to M consecutive subcarrier groups, where c is a non-zero complex number;

receiving a sending signal on the $i^{th}$ subcarrier group by using the transceiver 1101; and processing the received signal by using the first sequence.

In one embodiment, the sequence $\{x_i\}$ is a sequence that is found by using a computer, that is mapped into the M consecutive subcarrier groups, and that has a peak-to-average power ratio less than or equal to a threshold.

In one embodiment, when M=3, the sequence $\{x_i\}$ corresponding to the M subcarrier groups is $\{u, u, -u\}$; or when M=2, the second sequence $\{x_i\}$ corresponding to the M subcarrier groups is $\{u, uj\}$ or $\{u, -uj\}$, where j is an imaginary unit, and u is a non-zero complex number.

The processor 1102 may be a central processing unit (central processing unit, CPU), a network processor (network processor, NP), or a combination of a CPU and an NP.

The processor 1102 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory 1103 may include a volatile memory (volatile memory), such as a random access memory (random access memory, RAM). Alternatively, the memory 1103 may include a nonvolatile memory (nonvolatile memory), such as a flash memory (flash memory), a hard disk drive (hard disk drive, HDD), or a solid-state drive (solid-state drive, SSD). Alternatively, the memory 1103 may include a combination of the foregoing types of memories.

The signal receiving apparatus 1000 and the signal receiving apparatus 1100 may be configured to perform the signal sending and receiving method shown in FIG. 3. The processing unit 1001 in FIG. 10 may be implemented by the processor 1102 in FIG. 11, and the receiving unit 1002 in FIG. 10 may be implemented by the transceiver 1101 in FIG. 11.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct a computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Although some preferred embodiments of this application have been described, a person skilled in the art can make changes and modifications to these embodiments once they learn the basic inventive concept. Therefore, the following claims are intended to be construed as to cover the preferred embodiments and all changes and modifications falling within the scope of this application. Obviously, a person skilled in the art can make various modifications and variations to the embodiments of this application without departing from the spirit and scope of the embodiments of this application. In this way, this application is intended to cover these modifications and variations to the embodiments of this application provided that they fall within the scope of protection defined by the claims of this application and their equivalent technologies.

What is claimed is:

1. A method of sending signals in a Long Term Evolution (LTE) system, comprising:
    mapping, by a processing unit in a transmit end of the LTE system, a first sequence $\{p_ia_0, p_ia_1, \ldots, p_ia_{P-1}\}$ into an $i^{th}$ subcarrier group in M subcarrier groups, wherein a length of the first sequence is P, the M subcarrier groups are in a same time cell, the $i^{th}$ subcarrier group comprises K consecutive subcarriers that are evenly distributed, $M \geq 2$, $P \geq 2$, $K \geq 2$, $P \leq K$, M, P, and K are all positive integers, and $i=1, 2, \ldots, M$, wherein there are at least two consecutively numbered subcarrier groups in the M subcarrier groups: an $s^{th}$ subcarrier group and an $(s+1)^{th}$ subcarrier group, wherein s is a positive integer, wherein a minimum interval between a center frequency of any subcarrier in the $s^{th}$ subcarrier group and a center frequency of any subcarrier in the $(s+1)^{th}$ subcarrier group is greater than one subcarrier and a second sequence $\{p_i\}$ corresponding to the M subcarrier groups meets the following requirement: A sequence $\{x_i\}$ is a Barker sequence, wherein $x_1=p_{s+1}$, $x_2=p_{s+2}, \ldots, x_{M-s}=p_M, x_{M-s+1}=p_1, x_{M-s+2}=p_2, \ldots, x_M=p_s$, or a sequence $\{cx_i\}$ is a second sequence corresponding to M consecutive subcarrier groups, wherein c is a non-zero complex number;
    generating, by a processing unit in the transmit end, a sending signal based on signals on subcarriers in the $i^{th}$ subcarrier group; and
    sending, by a sending unit in the transmit end, the sending signal.

2. The method according to claim 1, wherein an interval between a center frequency of a $K^{th}$ subcarrier in the $s^{th}$ subcarrier group and a center frequency of a first subcarrier in the $(s+1)^{th}$ subcarrier group has a frequency bandwidth of $(L*K)+1$ sub carriers, and L is a positive integer.

3. The method according to claim 1, wherein the mapping, by a transmit end, a first sequence whose length is P into an $i^{th}$ subcarrier group in M subcarrier groups comprises:
    mapping, by the transmit end, the first sequence whose length is P into P subcarriers comprised in the $i^{th}$ subcarrier group.

4. The method according to claim 1, wherein
    the sequence $\{x_i\}$ is a sequence that is found by using a computer, that is mapped into the M consecutive subcarrier groups, and that has a peak-to-average power ratio less than or equal to a threshold.

5. The method according to claim 1, wherein
    the first sequence mapped into the $i^{th}$ subcarrier group is a sequence that carries control information; and/or
    the first sequence mapped into the $i^{th}$ subcarrier group is a sequence of a demodulation reference signal; and/or
    the first sequence mapped into the $i^{th}$ subcarrier group is a sequence of a sounding reference signal.

6. The method according to claim 1, wherein when the first sequence mapped into the $i^{th}$ subcarrier group is a sequence comprising at least two types of signals, multiplexing is performed for the at least two types of signals through frequency division or code division.

7. The method according to claim 1, wherein
    when $M=3$, the sequence $\{x_i\}$ corresponding to the M subcarrier groups is $\{u, u, -u\}$; or when $M=2$, the sequence $\{x_i\}$ corresponding to the M subcarrier groups is $\{u, uj\}$ or $\{u, -uj\}$, wherein j is an imaginary unit, and u is a non-zero complex number.

8. A signal sending apparatus, comprising:
    a processing unit, configured to map a first sequence $\{p_ia_0, p_ia_1, \ldots, p_ia_{P-1}\}$ into an $i^{th}$ subcarrier group in M subcarrier groups, wherein a length of the first sequence is P, the M subcarrier groups are in a same time cell, the $i^{th}$ subcarrier group comprises K consecutive subcarriers that are evenly distributed, $M \geq 2$, $P \geq 2$, $K \geq 2$, $P \leq K$, M, P, and K are all positive integers, and $i=1, 2, \ldots, M$, wherein there are at least two consecutively numbered subcarrier groups in the M subcarrier groups: an $s^{th}$ subcarrier group and an $(s+1)^{th}$ subcarrier group, wherein s is a positive integer, wherein a minimum interval between a center frequency of any subcarrier in the $s^{th}$ subcarrier group and a center frequency of any subcarrier in the $(s+1)^{th}$ subcarrier group is greater than one subcarrier, and a second sequence $\{p_i\}$ corresponding to the M subcarrier groups meets the following requirement: A sequence $\{x_i\}$ is a Barker sequence, wherein $x_1=p_{s+1}$, $x_2=p_{s+2}, \ldots, x_{M-s}=p_M, x_{M-s+1}=p_1, x_{M-s+2}=p_2, \ldots, x_M=p_s$, or a sequence $\{cx_i\}$ is a second sequence corresponding to M consecutive subcarrier groups, wherein c is a non-zero complex number, wherein
    the processing unit is further configured to generate a sending signal based on signals on subcarriers in the $i^{th}$ subcarrier group; and
    a sending unit, configured to send the sending signal generated by the processing unit.

9. The apparatus according to claim 8, wherein an interval between a center frequency of a $K^{th}$ subcarrier in the $s^{th}$ subcarrier group and a center frequency of a first subcarrier in the $(s+1)^{th}$ subcarrier group has a frequency bandwidth of $(L*K)+1$ sub carriers, and L is a positive integer.

10. The apparatus according to claim 8, wherein the processing unit is configured to:
    map the first sequence whose length is P into P subcarriers comprised in the $i^{th}$ subcarrier group.

11. The apparatus according to claim 8, wherein
    the sequence $\{x_i\}$ is a sequence that is found by using a computer, that is mapped into the M consecutive subcarrier groups, and that has a peak-to-average power ratio less than or equal to a threshold.

12. The apparatus according to claim 8, wherein
    the first sequence mapped into the $i^{th}$ subcarrier group is a sequence that carries control information; and/or
    the first sequence mapped into the $i^{th}$ subcarrier group is a sequence of a demodulation reference signal; and/or
    the first sequence mapped into the $i^{th}$ subcarrier group is a sequence of a sounding reference signal.

13. The apparatus according to claim 8, wherein when the first sequence mapped into the $i^{th}$ subcarrier group is a sequence comprising at least two types of signals, multiplexing is performed for the at least two types of signals through frequency division or code division.

14. The apparatus according to claim 8, wherein
    when $M=3$, the sequence $\{x_i\}$ corresponding to the M subcarrier groups is $\{u, u, -u\}$; or when $M=2$, the second sequence $\{x_i\}$ corresponding to the M subcarrier groups is $\{u, uj\}$ or $\{u, -uj\}$, wherein j is an imaginary unit, and u is a non-zero complex number.

15. A signal receiving apparatus, comprising:
    a processing unit, configured to generate a first sequence $\{p_ia_0, p_ia_1, \ldots, p_ia_{P-1}\}$ on an $i^{th}$ subcarrier group in M subcarrier groups, wherein a length of the first sequence is P, the M subcarrier groups are in a same time cell, the $i^{th}$ subcarrier group comprises K consecutive subcarriers that are evenly distributed, $M \geq 2$, $P \geq 2$, $K \geq 2$, $P \leq K$, M, P, and K are all positive integers, and i=1, 2, . . . , M, wherein there are at least two consecutively numbered subcarrier groups in the M subcarrier groups: an $s^{th}$ subcarrier group and an $(s+1)^{th}$ subcarrier group, wherein s is a positive integer, wherein a minimum interval between a center frequency of any subcarrier in the $s^{th}$ subcarrier group and a center frequency of any subcarrier in the $(s+1)^{th}$ subcarrier group is greater than one subcarrier and a second sequence $\{p_i\}$ corresponding to the M subcarrier groups meets the following requirement: A sequence $\{x_i\}$ is a Barker sequence, wherein $x_1=p_{s+1}$, $x_2=p_{s+2}$, . . . , $x_{M-s}=p_M$, $x_{M-s+1}=p_1$, $x_{M-s+2}=p_2$, . . . , $x_M=p_s$, or a sequence $\{cx_i\}$ is a second sequence corresponding to M consecutive subcarrier groups, wherein c is a non-zero complex number; and a receiving unit, configured to receive a sending signal on the $i^{th}$ subcarrier group, wherein the processing unit is further configured to process, by using the first sequence, the sending signal received by the receiving unit.

16. The apparatus according to claim 15, wherein an interval between a center frequency of a $K^t$ subcarrier in the $s^{th}$ subcarrier group and a center frequency of a first subcarrier in the $(s+1)^{th}$ subcarrier group has a frequency bandwidth of $(L*K)+1$ subcarriers, and L is a positive integer.

17. The apparatus according to claim 15, wherein the receiving unit is configured to generate the first sequence on P subcarriers comprised in the $i^{th}$ subcarrier group.

18. The apparatus according to claim 15, wherein the sequence $\{x_i\}$ is a sequence that is found by using a computer, that is mapped into the M consecutive subcarrier groups, and that has a peak-to-average power ratio less than or equal to a threshold.

19. The apparatus according to claim 15, wherein the first sequence mapped into the $i^{th}$ subcarrier group is a sequence that carries control information; and/or the first sequence mapped into the $i^{th}$ subcarrier group is a sequence of a demodulation reference signal; and/or the first sequence mapped into the $i^{th}$ subcarrier group is a sequence of a sounding reference signal.

20. The apparatus according to claim 15, wherein when the first sequence mapped into the $i^{th}$ subcarrier group is a sequence comprising at least two types of signals, multiplexing is performed for the at least two types of signals through frequency division or code division.

* * * * *